(12) United States Patent
Chen et al.

(10) Patent No.: US 7,596,095 B2
(45) Date of Patent: Sep. 29, 2009

(54) NETWORK DEVICE TEST SYSTEM AND METHOD FOR TESTING NETWORK DEVICE

(75) Inventors: Chien-Hua Chen, Taipei Hsien (TW); Han-Tzung Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 472 days.

(21) Appl. No.: 11/617,759

(22) Filed: Dec. 29, 2006

(65) Prior Publication Data

US 2008/0043630 A1    Feb. 21, 2008

(30) Foreign Application Priority Data

Aug. 18, 2006   (TW)  ............... 95130415 A

(51) Int. Cl.
*H04J 1/16*     (2006.01)

(52) U.S. Cl. .................................. 370/244

(58) Field of Classification Search .............. None
See application file for complete search history.

(56) References Cited

U.S. PATENT DOCUMENTS

| | | | |
|---|---|---|---|
| 5,850,386 A * | 12/1998 | Anderson et al. | 370/241 |
| 6,212,563 B1 * | 4/2001 | Beser | 709/227 |
| 6,611,868 B1 * | 8/2003 | Arutyunov | 709/227 |
| 7,010,782 B2 | 3/2006 | Narayan et al. | |
| 2007/0162556 A1 * | 7/2007 | Ho et al. | 709/208 |

FOREIGN PATENT DOCUMENTS

CN     1805377 A     7/2006

OTHER PUBLICATIONS

Ling Chen, Xiaojun Qin, Hao Huang, "Design and Implementation of Network Device Monitor System", Microcomputer Information, Oct. 2005, pp. 42-44, vol. 21, Issue 10-3, Microcomputer Information Publication Group, Beijing, China.

* cited by examiner

*Primary Examiner*—Frank Duong
(74) *Attorney, Agent, or Firm*—Wei Te Chung

(57) ABSTRACT

A network device test method is provided. The network device test method comprises providing at least one leasing module, at least one monitoring module, at least one saving module, at least one displaying module, and at least one agent module, disposed in the network device; providing a controller comprising a managing module and an address assigning module; the leasing module leasing addresses for the network devices from the address assigning module; the managing module sending test command to the agent module via the leased addresses; the network device entering a test mode according to the test command, and the monitoring module monitoring whether errors occur in the network devices, and capturing test data from the network devices; and the network device entering a fail mode, if any errors occur in the network devices. A network device test system is also provided.

18 Claims, 4 Drawing Sheets

NETWORK DEVICE TEST SYSTEM AND METHOD FOR TESTING NETWORK DEVICE

BACKGROUND OF THE INVENTION

1. Field of the Invention

The present invention relates to an electronic device test system and method, and particularly to a network device test system and method for testing network devices.

2. Related of Prior Art

A run-in test is used to test stability of a network device, such as a set top box (STB). For example, it is necessary to test the STB, a server, a terminal, a video switcher, and a switch for ensuring stability thereof. The server serves as a network file system (NFS) server, a dynamic host configuration protocol (DHCP) server, and a content provider. The switch connects multiple STBs to the server, and the video switcher connects the multiple STBs to the terminal. The STB firstly obtains an Internet protocol (IP) address from the DHCP server, then receives data, such as movie files, transmitted from the content provider via the IP address, and decodes the movies. Then an operator employs the terminal to collect the decoded movies via the video switcher, and checks whether the STB plays the movies smoothly and records test results. However, if an operator is careless, the test results will be unreliable.

Therefore, a heretofore unaddressed need exists in the industry to ensure reliability of the test results.

SUMMARY OF THE INVENTION

An exemplary embodiment of the invention provides a network device test system. The network device test system includes at least one leasing module, at least one monitoring module, at least one saving module, at least one agent module, and a controller. The at least one leasing module is disposed in each of the network devices for leasing addresses for the network devices. The at least one monitoring module is disposed in each of the network devices for monitoring whether errors occur in the network devices, and capturing test data from the network devices. The at least one saving module is disposed in each of the network devices for saving the test data captured by the monitoring module. The at least one agent module is disposed in each of the network devices for modifying data in the saving module, and informing of a test status of the network devices. The controller comprises an address assigning module for assigning a unique address for each of the network devices according to requests sent by the leasing module. The connecting device connects the controller to the multiple network devices.

Another exemplary embodiment of the invention provides a network device test method. The network device test method comprises providing at least one leasing module, at least one monitoring module, at least one saving module, at least one displaying module, and at least one agent module, disposed in the network device; providing a controller comprising a managing module and an address assigning module; the leasing module leasing addresses for the network devices from the address assigning module; the managing module sending test commands to the agent module via the leased addresses; the network device entering a test mode according to the test command, and the monitoring module monitoring whether errors occur in the network devices, and capturing test data from the network devices; and the network device entering a fail mode, if any errors occur in the network devices.

Other objectives, advantages and novel features of the present invention will be drawn from the following detailed description of preferred embodiments of the present invention with the attached drawings, in which:

DETAILED DESCRIPTION OF THE INVENTION

Figure 1:
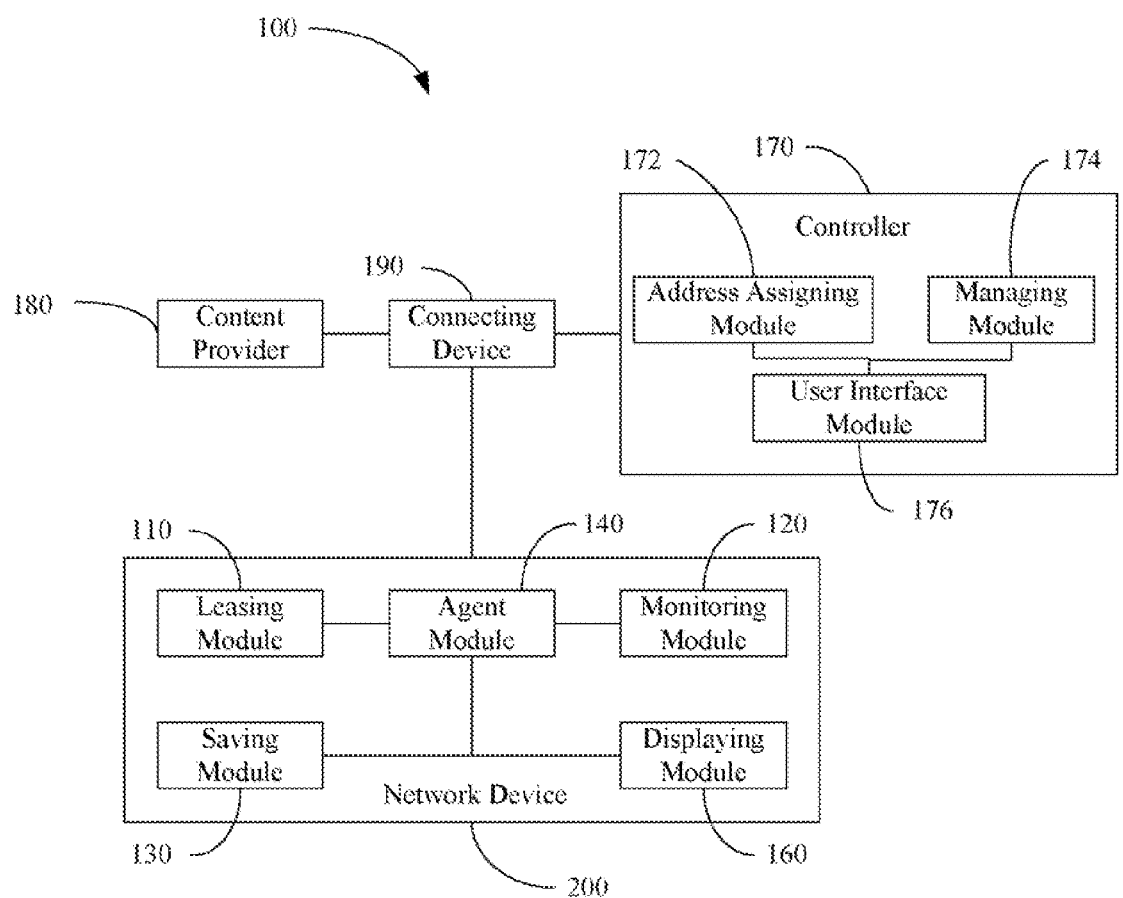
FIG. 1 is a block diagram of a network device test system of an exemplary embodiment of the present invention.

FIG. 1 is a block diagram of a network device test system 100 of an exemplary embodiment of the present invention.

A network device test system 100 for testing multiple network devices 200 includes at least one network device 200, a controller 170, a content provider 180, and a connecting device 190. The network device 200 includes at least one leasing module 110, at least one monitoring module 120, at least one saving module 130, at least one agent module 140, and at least one displaying module 160. In this embodiment, only one network device 200 is shown in FIG. 1.

The network device 200 is a set top box, and the content provider 180 is a server using a Linux operating system for providing video data for the set top box. The connecting device 190 is a switch for connecting the controller 170 to the network devices 200.

The at least one leasing module 110 of the network devices 200 is for leasing addresses for the network devices 200. In this embodiment, the leasing module 110 is a dynamic host configuration protocol (DHCP) client.

The at least one monitoring module 120 of the network devices 200 is for monitoring whether errors occur in the network devices 200, and capturing test data from the network devices 200. In this embodiment, the errors include the set top box hanging.

The at least one saving module 130 of the network devices 200 is for saving the test data captured by the monitoring module 120. In this embodiment, the saving module 130 is a message information base (MIB), comprising multiple objects. Each of the objects has a unique ID. If errors occur in the network devices 200, the monitoring module 120 records the errors into the saving module 130.

The at least one agent module 140 of the network devices 200 is for modifying data in the saving module 130, and informing of a test status of the network devices 200.

The at least one displaying module 160 of the network devices 200 is for displaying the test status of each of the network devices 200. In this embodiment, the displaying module 160 includes multiple light emitting diodes (LEDs), which indicates test statuses of the network devices 200 by displaying different colored light.

In detail, after the network device 200 powers up, if the LEDs are unlit, then the network device 200 has failed to power up, or the LEDs may be defective; if the LEDs blink together, then the network device 200 has successfully powered up, and is ready for receiving test commands; if the LEDs alternately blink, the network device 200 is in a test status, and no error has occurred in the network device 200; if a steady red light is emitted form the LEDs, then the test has failed; if a steady green light is emitted form the LEDs, then the test has been passed.

The controller 170 includes an address assigning module 172, a managing module 174, and a user interface module 176.

The address assigning module 172 assigns a unique address to each of the network devices 200 according to requests sent by the leasing module 110. In this embodiment, the address assigning module 172 is a DHCP server.

The managing module 174 manages the agent module 140 by sending a write request and a read request to the agent module 140 via the ID. The agent module 140 reads data from corresponding object of the saving module 130 according to the read request, and modifies data in corresponding object of the saving module 130 according to the write request. In this embodiment, the managing module 174 is a simple network management protocol (SNMP) management system, and the agent module 140 is a SNMP agent.

The agent module 140 also sends the read data and the modified data to the managing module 174, and sends the test status to the managing module 174 via a trap packet. In this embodiment, if the network device 200 successful powers, the agent module 140 sends a trap packet including successful power, to the managing module 174. If the network device 200 fails to power, the agent module 140 sends a trap packet, which includes failed, to the managing module 174. If the network device 200 passes the test, the agent module 140 sends a trap packet including success to the managing module 174.

The user interface module 176 receives user input, including a start input, a read input, a change input, and a stop input. In this embodiment, a user can press a start or an end button designed in the user interface module 176 to start or terminate the test respectively. The user can also press a read or a write button designed in the user interface module 176 to get the test status or modify data in a corresponding object of the saving module 130 respectively. After the above-mentioned buttons are pressed, the user interface module 176 sends corresponding commands to the managing module 174 for changing the commands into the write requests or the read requests. If the test fails, the user interface module 176 further generates a dialogue window to indicate the test has failed.

Figure 2:
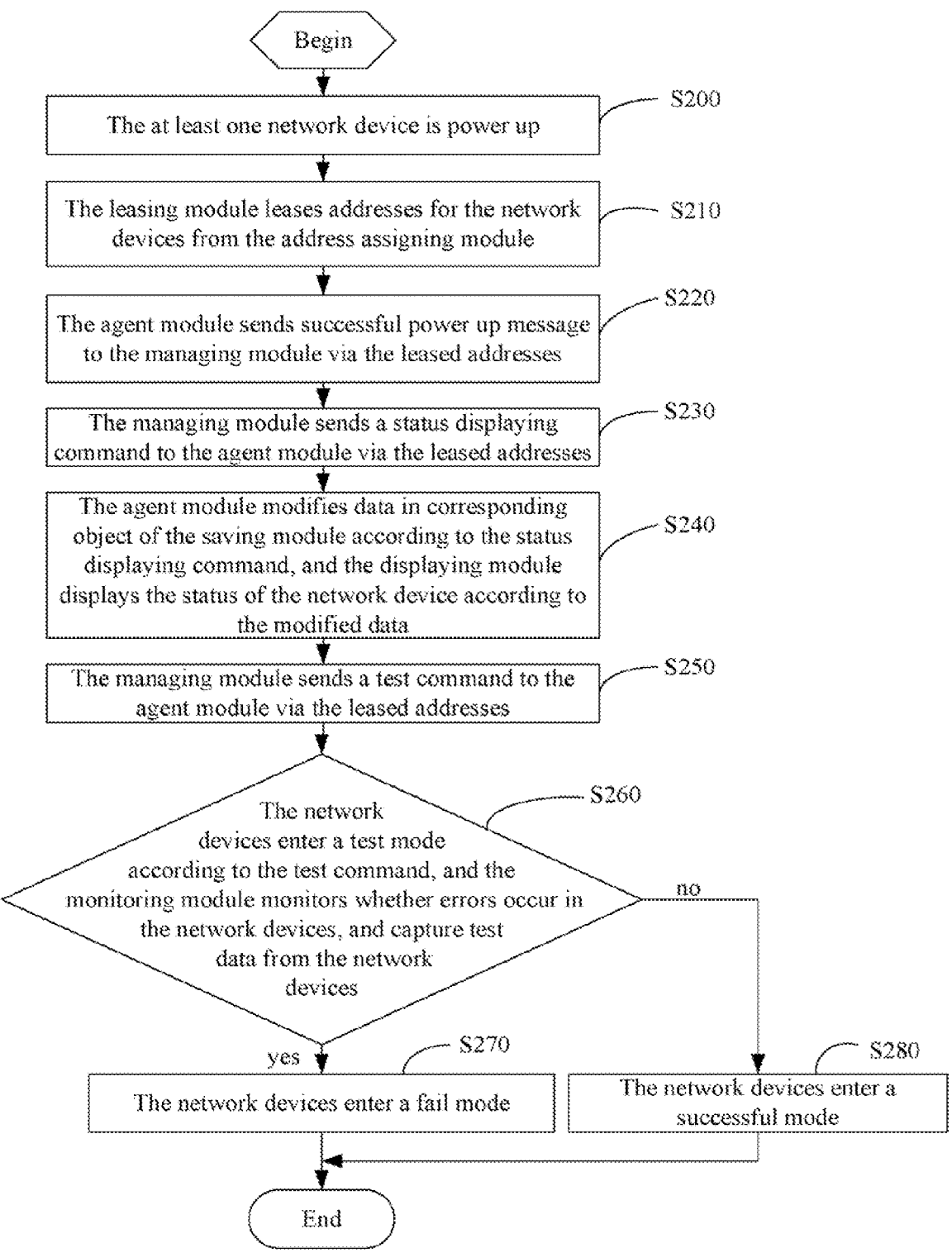
FIG. 2 is a flowchart of a network device test method of another exemplary embodiment of the present invention.

FIG. 2 is a flowchart of a network device test method of another exemplary embodiment of the present invention.

In step S200, the at least one network device 200 is power up. If the LEDs are unlit, the network device 200 has failed to power up, or the LEDs are defective, and the process stops. Otherwise, step S210 is next.

In step S210, the leasing module 110 leases addresses for the network devices 200 from the address assigning module 172. In detail, the leasing module 110 broadcasts a DHCP discover packet for looking for a DHCP server; the address assigning module 172, receiving the DHCP discover packet, sends a DHCP offer packet including an un-leased IP address to the leasing module 110; the leasing module 110 broadcasts a DHCP request packet including the un-leased IP address to the address assigning module 172; the address assigning module 172 sends a DHCP ACK packet including the un-leased IP address and a subnet to the leasing module 110 to inform that the leasing module 110 can use the un-leased IP address.

In step S220, the agent module 140 sends successful power up message to the managing module 174 via the leased addresses. In this embodiment, the successful power up message is included in a trap packet.

In step S230, the managing module 174 sends a status displaying command to the agent module 140 via the leased addresses. In this embodiment, the status displaying command is the write request, and the write request includes the ID of a corresponding object of the network device 200 that successfully powers up.

In step S240, the agent module 140 modifies data in a corresponding object of the saving module 130 according to the status displaying command, and the displaying module 160 displays the status of the network device 200 according to the modified data. In this embodiment, the LEDs of the displaying module 160 blink to indicate that the network device 200 has successfully powers up, and is ready for receiving test commands.

In step S250, the managing module 174 sends a test command to the agent module 140 via the leased addresses. In this embodiment, the network device 200 is a set top box. The test command is the write request, which includes the ID of a corresponding object of the network device 200. After receiving the test command, the network device 200 send a request to the content provider 180 to get video data and play it.

In step S260, the network devices 200 enter a test mode according to the test command, and the monitoring module 120 monitors whether errors occur in the network devices 200, and capture test data from the network devices 200. At this time, if any error occurs in the network devices 200, the monitoring module 120 records the error into the saving module 130. If any errors occur in the network devices 200, the process proceeds to step S270. If no errors occur in the network devices 200, the process proceeds to step S280.

In step S270, the network devices 200 enter a fail mode. For more details, please refer to FIG. 3.

In step S280, the network devices 200 enter a successful mode. For more details, please refer to FIG. 4.

Figure 3:
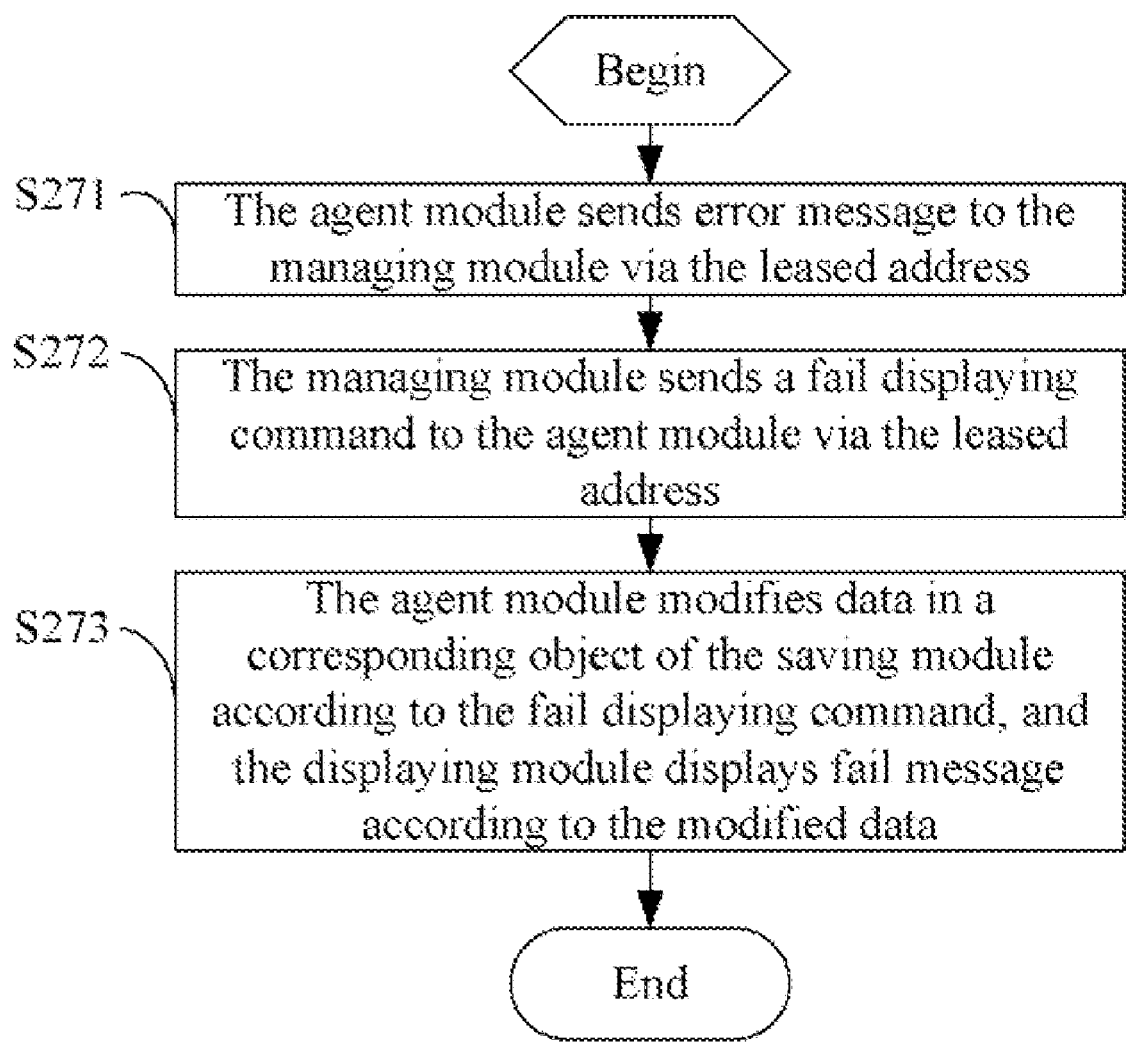
FIG. 3 is a flowchart of details of a step S270 of FIG. 2.

FIG. 3 is a flowchart of details of a step of S270 of FIG. 2.

When the network devices 200 enter a fail mode, in step S271, the agent module 140 sends error message to the managing module 174 via the leased address. In this embodiment, the error message is included in the trap packet.

In step S272, the managing module 174 sends a fail displaying command to the agent module 140 via the leased address. In this embodiment, the fail displaying command is the write request, which includes the ID of a corresponding object of the failed network device 200.

In step S273, the agent module 140 modifies data in a corresponding object of the saving module 130 according to the fail displaying command, and the displaying module 160 displays fail message according to the modified data. In this embodiment, the LEDs continuously emit red light to indicate that the test has failed.

Figure 4:
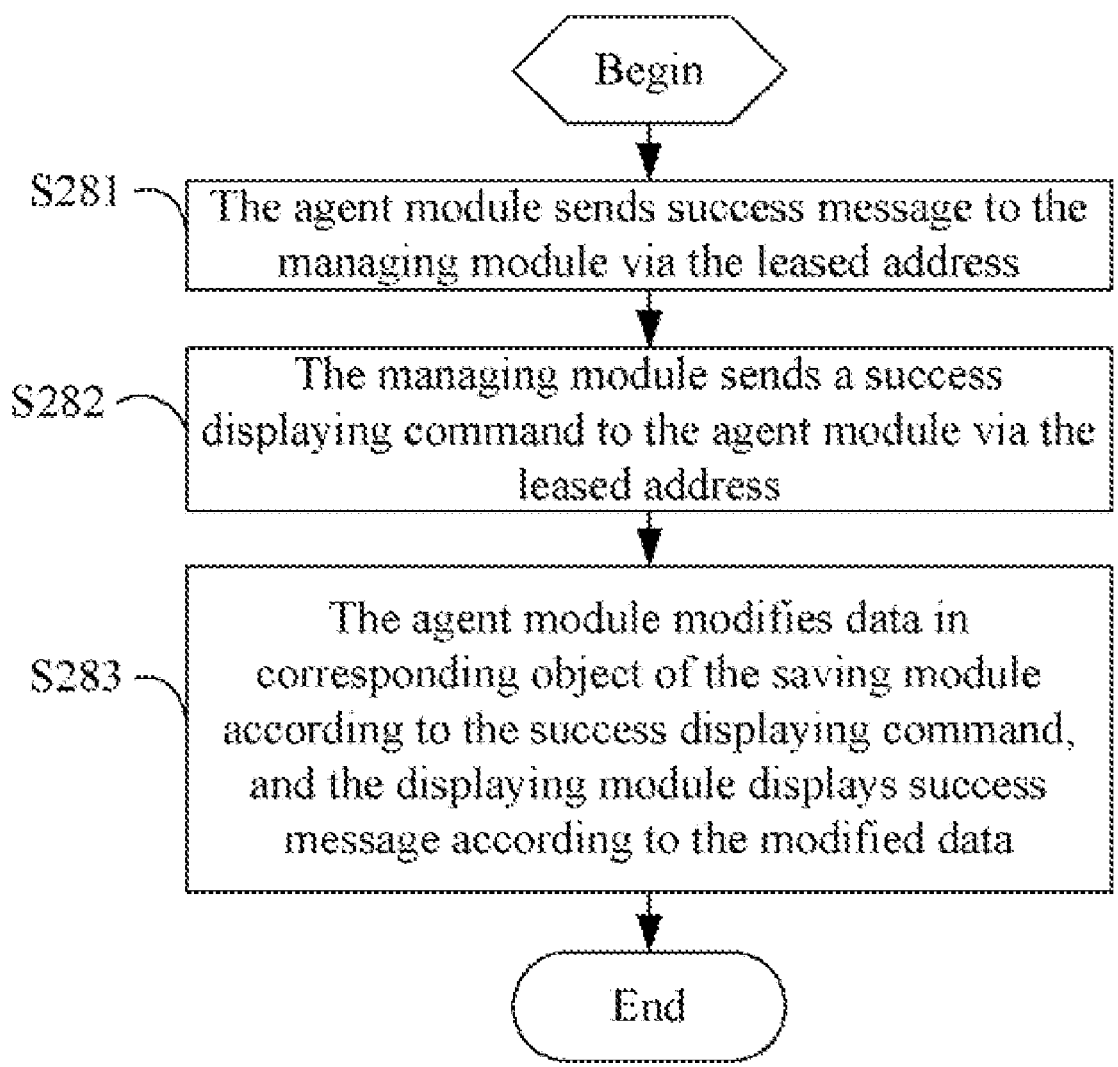
FIG. 4 is a flowchart of details of a step S280 of FIG. 2.

FIG. 4 is a flowchart of details of a step of S280 of FIG. 2.

In step S281, the agent module 140 sends success message to the managing module 174 via the leased address. In this embodiment, the success message is included in the trap packet.

In step S282, the managing module 174 sends a success displaying command to the agent module 140 via the leased address. In this embodiment, the success displaying command is the write request, which includes the ID of the corresponding object of the successful network device 200.

In step S283, the agent module 140 modifies data in corresponding object of the saving module 130 according to the success displaying command, and the displaying module 160 displays success message according to the modified data. In this embodiment, the LEDs continuously emit green light to indicate that the test is successful.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A network device test system, for testing multiple network devices, comprising:
    at least one network device comprising:
        at least one leasing module, for leasing addresses for the network devices;
        at least one monitoring module, for monitoring whether errors occur in the at least one network device, and capturing test data from the at least one network device;
        at least one saving module, for saving the test data captured by the at least one monitoring module; and
        at least one agent module, for modifying data in the saving module, and informing of a test status of the at least one network device;
    a controller, comprising an address assigning module for assigning a unique address to the at least one network device according to requests sent by the at least one leasing module; and
    a connecting device, for connecting the controller to the at least one network device.

2. The network device test system as recited in claim 1, wherein the at least one saving module is a message information base, comprising a plurality of objects.

3. The network device test system as recited in claim 2, wherein each of the objects has a unique identification (ID).

4. The network device test system as recited in claim 3, wherein the controller further comprises a managing module for managing the at least one agent module by sending a write request and a read request to the at least one agent module via the ID.

5. The network device test system as recited in claim 4, wherein the at least one agent module reads data saved in the objects according to the read request, and modifies data in the objects according to the write request.

6. The network device test system as recited in claim 5, wherein the at least one managing module is a simple network management protocol (SNMP) management system, and the at least one agent module is an SNMP agent.

7. The network device test system as recited in claim 1, wherein the network device is a set top box, and the connecting device is a switch.

8. The network device test system as recited in claim 7, further comprising a content provider for providing video data for the set top box.

9. The network device test system as recited in claim 1, wherein the controller further comprises a user interface module for receiving user input, and user input includes a start input, a read input, a change input, and a stop input.

10. The network device test system as recited in claim 1, wherein the at least one network device further comprises at least one displaying module for displaying the test status of the at least one network device.

11. The network device test system as recited in claim 10, wherein the displaying module comprises a plurality of light emitting diodes.

12. The network device test system as recited in claim 11, wherein the at least one leasing module is a dynamic host configuration protocol (DHCP) client, and the address assigning module is a DHCP server.

13. A network device test method, comprising:
    providing at least one leasing module, at least one monitoring module, at least one saving module, at least one displaying module, and at least one agent module, disposed in a network device;
    providing a controller comprising a managing module and an address assigning module;
    the at least one leasing module leasing addresses for the network device from the address assigning module;
    the managing module sending a test command to the at least one agent module via the leased addresses;
    the network device entering a test mode according to the test command, and the monitoring module monitoring whether errors occur in the network device, and capturing test data from the network device; and
    the network device entering a fail mode, if any errors occur in the network device.

14. The network device test method as recited in claim 13, further comprising:
    the network device powers up; and
    the at least one agent module sending a successful power up message to the managing module via the leased addresses.

15. The network device test method as recited in claim 14, further comprising:
    the managing module sending a status displaying command to the agent module via the leased addresses; and
    the agent module modifying data in a corresponding object of the saving module according to the status displaying command, and the displaying module displaying the status of the network device according to the modified data.

16. The network device test method as recited in claim 13, wherein the step of the network device entering a fail mode comprising:
    the agent module sending an error message to the managing module via the leased address;
    the managing module sending a fail displaying command to the agent module via the leased address; and
    the agent module modifying data in a corresponding object of the saving module according to the fail displaying command, and the displaying module displaying a fail message according to the modified data.

17. The network device test method as recited in claim 13, further comprising a step of the network device entering a successful mode, if no errors occur in the network device.

18. The network device test method as recited in claim 17, wherein the step of the network device entering a successful mode comprising:
    the at least one agent module sending a success message to the managing module via the leased address;
    the managing module sending a success displaying command to the agent module via the leased address; and
    the agent module modifying data in a corresponding object of the saving module according to the success displaying command, and the displaying module displaying a successful message according to the modified data.

* * * * *